Figure 1:
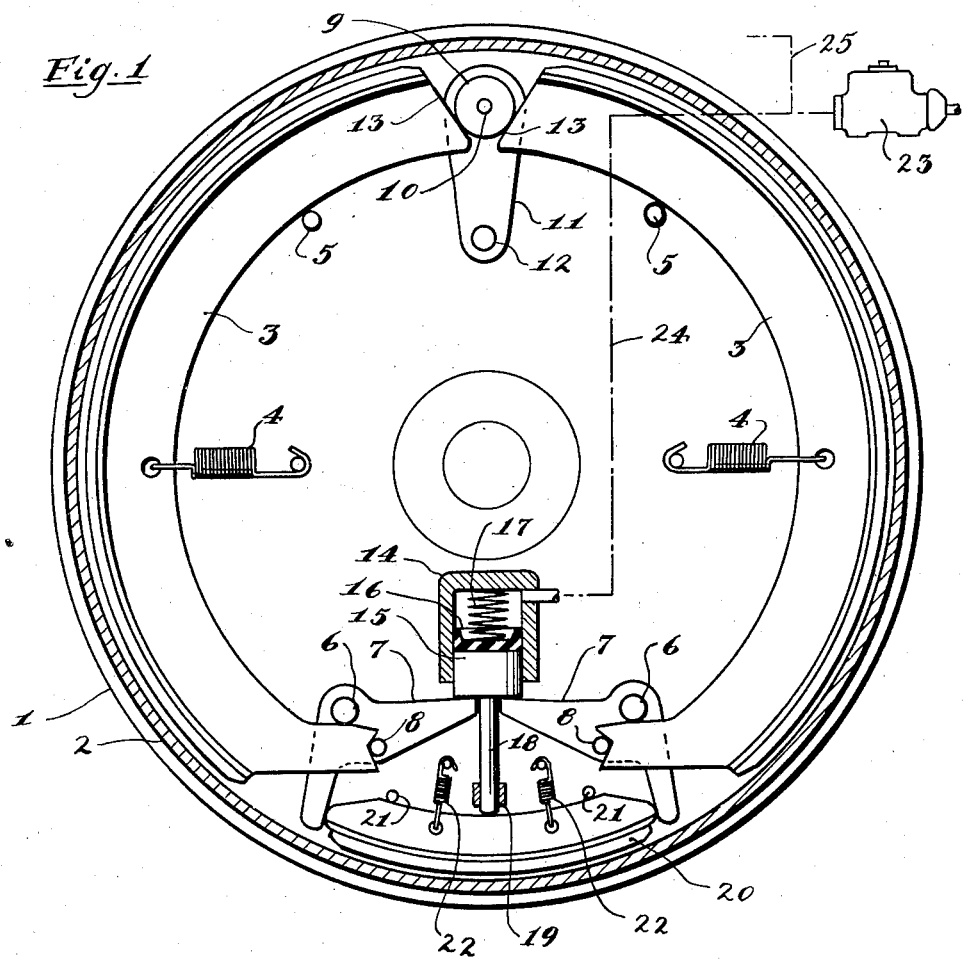

Aug. 15, 1944.  W. STELZER  2,355,827
BRAKE
Filed Jan. 16, 1943

INVENTOR.
William Stelzer

Patented Aug. 15, 1944

2,355,827

UNITED STATES PATENT OFFICE 2,355,827

BRAKE

William Stelzer, Detroit, Mich.

Application January 16, 1943, Serial No. 472,539

3 Claims. (Cl. 188—78)

The invention relates to brakes, and more particularly to a torque-reactive brake where a brake actuator is used to engage a control shoe, and the control shoe engages the friction members with the brake drum.

The novel invention incorporates the principle of using the brake torque as a compensating force to obtain a braking effect that is in a pre-determined proportion to the braking effort as disclosed in my co-pending application Serial No. 462,067, filed October 15, 1942.

The object of the invention is to produce a novel brake where the movement to actuate the brake is a minimum to obviate the necessity of brake adjustment during the life of the brake lining.

Another object is to equalize the pressures over the entire brake surfaces to obtain uniform wear which is a contributing factor to prolong the life of the friction surfaces.

A further aim is to provide a construction that functions in the same manner regardless of the direction of rotation of the brake drum.

Figure 2:
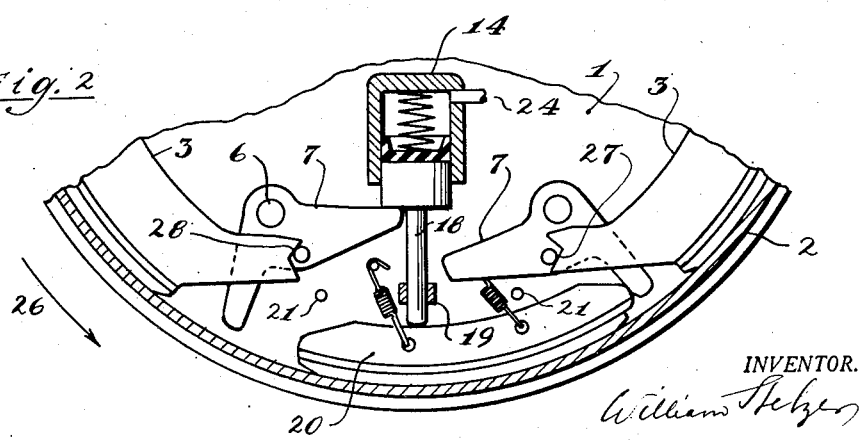

Other objects and advantages of this invention will be apparent from the following detailed description considered in connection with the accompanying drawing submitted for the purpose of illustration and not define the scope of the invention, reference being had for that purpose to the subjoined claims. In the drawing, wherein similar reference characters refer to similar parts throughout the several views:

Fig. 1 is a side elevation of a brake built according to the novel principle, where the brake drum and the actuator are shown in section to provide an unincumbered view of the brake construction; and Fig. 2 is a fragmentary view similar to Fig. 1, showing the parts in an operating position. Both views are diagrammatic to facilitate the illustration of the principle.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

In the embodiment shown in Fig. 1 the invention is applied to a wheel brake of an automotive vehicle, where 1 represents a conventional fixed backing plate and 2 the brake drum which revolves with the wheel. The latter is shown removed in order not to encumber the drawing. The friction members or brake shoes 3 are arranged near the drum and are urged into a released position by retraction springs 4 to rest against stop pins 5 and anchor studs 6 extending from the backing plate. Studs 6 are long enough to pivotally support bell cranks or actuator levers 7 and to serve as stops for said brake shoes.

Bell cranks 7 have studs 8 secured thereto to engage the V-shaped ends of shoes 3. The latter have no fixed anchor point, but are joined merely by a roller 9 on a pin 10 secured to a link 11 pivoted to the backing plate at 12. The webs of shoes 3 form a certain angle at 13 with respect to the roller to reduce the self-energizing effect and to provide an even pressure of the shoes against the drum when applied.

The brake is applied by means of an actuator comprising a cylinder 14, piston 15 having a seal 16 retained by a spring 17, and a piston rod 18 guided in a bearing 19 and pressing against the web of auxiliary or control shoe 20 which in the "off" position is held against stop pins 21 by return springs 22 extending from the backing plate.

To energize the actuator I show a hydraulic master cylinder 23 connected with a hydraulic line 24. Line 25 is indicated to lead to the other brakes of the vehicle.

In operation, supposing that the brake drum revolves in a counterclockwise rotation as indicated by arrow 26, and that the operator operates the master cylinder to communicate a hydraulic pressure through line 24 to cylinder 14, piston 15 is depressed and the brake parts assume a position as shown in Fig. 2, because as soon as shoe 20 is brought into contact with the drum it is carried by the latter to revolve with it, acting against lever 7 to engage shoe 3 through stud 8. The brake torque is transmitted through roller 9 to the left shoe 3 to act on pin 8 at the left. The pressure on pin 8 results in a force acting to oppose piston 15 in proportion to the brake torque.

If the brake torque produced is small despite a certain pressure in cylinder 14, the force opposing piston 15 is small, leaving a greater force to act on shoe 20 which in turn enforces the application of shoes 3 until the various forces become balanced. The result is that the brake torque produced is in a nearly pre-determined proportion to the hydraulic pressure in cylinder 14 or the manual effort of the operator. The variation in brake torque produced is only a few per cent of the variation in the coefficient of friction of the brake shoes, i. e., if the coefficient of friction were reduced to one half, the reduction in brake torque would be only a few per cent. In a conventional brake, if the coefficient of friction were reduced to one half, then the brake torque would be only one half, or even less, if self-energization is considered.

To maintain the ratio between force of application and brake torque as nearly constant as possible, regardless of the variations and changes of the coefficient of friction, it is desirable to keep the ratio between the length of lever 7 from pivot 6 to the point of contact with shoe 20 and the distance between pivot 6 and pin 8 as large as possible so as to give a mechanical advantage to shoe 20 and to reduce its necessary effort, as well as the force required by rod 18. When this force is small as compared with the force due to the brake torque, the application of shoe 20 becomes more nearly dependent on the balance of forces between the brake torque and the hydraulic pressure in cylinder 14.

The surfaces of the shoes 3 that transmit the brake torque or receive the force of application form a certain angle with the contacting members. The purpose of this is to modify the radial force of the shoes against the brake drum. It is well known to those versed in the art that due to the self-energizing effect the radial force at the energizing end is smaller than at the end where the brake torque acts, resulting in greater wear at the latter point. To obviate this drawback in this novel construction, the oblique contact surfaces on the webs of shoes 3 are so arranged that where the shoe is energized it is pressed outwardly as at 27 to increase the pressure, and where the brake torque is received the shoe is urged inwardly, as at 28 and 13. It will be observed that if the rotation of the brake drum is reversed an exactly similar action takes place due to the position of pins 8 which move outwardly when energizing the brake shoes.

The obliquity of the contact surfaces is selected according to the self-energizing characteristics of the brake, which depends on the coefficient of friction of the shoes, their flexibility, and the arc of contact. If the coefficient of friction of the material used for the linings is greater, the angle of obliquity should be smaller, i. e., surfaces 13 should be more nearly radial.

The object of the compensator link 11 is to transmit the brake torque from one shoe to the other without producing a torque reaction on the backing plate. Thus the total torque is taken up at 28 to be transmitted to anchor stud 6.

While I have shown an actuator cylinder 14 operated by hydraulic pressure, it is apparent that piston 15 could be depressed manually or mechanically without changing the principle of the invention.

I claim:

1. A brake comprising a brake drum, a control friction member near said brake drum, an actuator to press said control friction member against said brake drum in a radial direction, brake shoes near said brake drum, said control friction member being free to revolve with said drum a short distance to urge said brake shoes into frictional engagement with said brake drum, means responsive to the brake torque to oppose said actuator in proportion to the brake torque, means intermediate said brake shoes to transmit the brake torque from one shoe to the other and to reduce the self-energizing effect, means to increase the radial pressure between brake shoe and drum at the energizing end which is where said control shoe engages a brake shoe, and means to decrease the radial pressure between shoe and drum where the brake torque is highest.

2. The construction as claimed in claim 1, where said actuator comprises a hydraulic cylinder, a piston therein, and hydraulic means to actuate said piston.

3. The construction as claimed in claim 1, where said means intermediate said brake shoes for transmitting the brake torque is arranged to float and has a pivot point to receive part of the radial force of said brake shoes.

WILLIAM STELZER.